United States Patent [19]
Burke

[11] Patent Number: 6,000,281
[45] Date of Patent: Dec. 14, 1999

[54] METHOD AND APPARATUS FOR MEASURING CRITICAL DIMENSIONS ON A SEMICONDUCTOR SURFACE

[75] Inventor: Peter A. Burke, Austin, Tex.

[73] Assignee: Advanced Micro Devices, Inc., Sunnyvale, Calif.

[21] Appl. No.: 09/072,263

[22] Filed: May 4, 1998

[51] Int. Cl.[6] .............................. G01B 5/14; G01B 7/14
[52] U.S. Cl. ........................................................ 73/105
[58] Field of Search ................... 73/104, 105; 250/306, 250/307

[56] References Cited

U.S. PATENT DOCUMENTS

| | | | |
|---|---|---|---|
| 5,283,442 | 2/1994 | Martin et al. | 250/307 X |
| 5,321,977 | 6/1994 | Clabes et al. | 73/105 |
| 5,450,505 | 9/1995 | Keller | 250/310 X |
| 5,528,033 | 6/1996 | Lo et al. | 250/307 X |
| 5,578,745 | 11/1996 | Bayer et al. | 73/105 X |
| 5,591,903 | 1/1997 | Vesenka et al. | 73/105 |
| 5,621,210 | 4/1997 | Lindsay | 73/105 X |
| 5,665,905 | 9/1997 | Bartha et al. | 73/105 |

OTHER PUBLICATIONS

Griffith et al., "Dimensional Metrology of Phase–Shifting Masks with Scanning Probe Microscopes", SPIE vol. 2087 Photomask Technology and Management, 1993, pp. 107–118.

Griffith et al., "Dimensional Metrology with Scanning Probe Microscopes", J. Appl. Phys., vol. 74, No. 09, Nov. 1, 1993, pp. R83–R109.

Keller et al., "Envelope Reconstruction of Probe Microscope Images", Surface Science, vol. 294. 1993, pp. 409–419.

Markiewicz et al., "Atomic Force Microscopy Probe Tip Visualization Improvement of Images Using a Simple Deconvolution Procedure", Langmuir, vol. 10, No. 01, Jan. 21, 1994, pp. 5–7.

Martin et al., "Method for Imaging Sidewalls By Atomic Force Microscopy", Appl. Phys. Lett., vol. 64, No. 19, May 9, 1994, pp. 2498–2500.

*Primary Examiner*—Daniel S. Larkin
*Attorney, Agent, or Firm*—Kevin L. Daffer; Conley, Rose & Tayon

[57] ABSTRACT

A combined atomic force microscope and stylus profilometer adapted to measure critical dimensions on a surface. The stylus profilometer is placed at a first position sufficiently near an edge of a first feature and the atomic force microscope subsequently measures the distance from this first position to the edge. The stylus profilometer is then positioned at a second position sufficiently near an edge of a second feature, measuring the distance from the first position to the second position. The atomic force microscope then measures the distance from the second position to the edge of the second feature.

15 Claims, 4 Drawing Sheets

METHOD AND APPARATUS FOR MEASURING CRITICAL DIMENSIONS ON A SEMICONDUCTOR SURFACE

BACKGROUND OF THE INVENTION

1. Field of the Invention

This invention relates to semiconductor metrology and, more specifically, to performing measurements of critical dimensions on semiconductor surfaces using a combined stylus profilometer and atomic force microscope.

2. Description of the Relevant Art

An exemplary listing of critical dimensions (CDs) includes the width of a patterned line, the distance between two lines or devices, and the size of a contact. CDs must be monitored to maintain proper device performance. As device sizes continue to decrease at a rapid rate, it has become clear that the ability to carry out quick, inexpensive, reliable, accurate, high-resolution, non-destructive measurements of CDs in the semiconductor industry is crucial.

Measuring CDs is usually done during or after lithography. During lithography, a thin film of photoresist is applied to a semiconductor surface. This surface is then exposed to electromagnetic radiation through a mask which contains a specified pattern consisting of clear and opaque regions. Following exposure, portions of the photoresist are removed during a developing process, producing an image of the mask's pattern onto the substrate. Following development, portions of the substrate no longer covered by photoresist are etched away in order to transfer the mask's pattern onto the semiconductor substrate itself. Many factors occurring during these lithography steps affect the critical dimensions of a semiconductor device. For example, variations in the thickness of the applied photoresist, lamp intensity during the exposure process, and developer concentration all result in variations of semiconductor linewidths. Linewidth variations also occur whenever a line is in the vicinity of a step (a sudden increase in topography). Step-induced changes in linewidth are believed to be caused by at least three different factors including: a) differences in the energy transferred to the photoresist at different photoresist thicknesses, b) light scattering at the edges of the steps, and c) standing wave effects. Because these factors affect CDs greatly, it is important to monitor semiconductor devices quickly and reliably in order to guarantee acceptable performances.

Several different techniques are currently utilized to measure CDs. These include: optical microscopy, scanning electron microscopy, stylus profilometry, atomic force microscopy, and scanning tunneling microscopy. Each of the above will be discussed briefly in turn.

Optical microscopy techniques include the scanning slit technique, video-based acquisition systems, and scanning laser methods. In the scanning slit technique, white light is shined onto a sample, and a photomultiplier tube measures the reflected light passing through a narrow slit which is scanned across the surface of the wafer over a region of interest. The intensity profile output of the photomultiplier tube is used to create a densitometer profile; this profile can then be analyzed using one of several edge-sensing algorithms to generate critical dimension measurements. Video based systems operate on a similar principle. An operator chooses a region of interest on the sample which is illuminated with white light. The light reflected from the region of interest is captured by a video camera which converts an intensity profile of the region into a digital waveform. This waveform is then analyzed to determine the edges of features on the sample and to correspondingly measure critical dimensions of the sample. Scanning laser techniques operate by scanning a laser spot across a region of interest. Typically, a He—Ne laser is focused to a one-micron spot which is scanned across the features of the sample being measured. As with the optical methods discussed above, the light reflected from the sample is then measured to create a topographic profile. Methods for measuring the reflected light profile and for creating a corresponding topographic profile include: using a pair of photodiodes positioned on either side of the laser scan axis, utilizing a confocal scanned microscope and photomultiplier tube, and using laser interferometry techniques. Although resolution has been reported to be 0.25 microns with such optical techniques, several problems limit their capabilities. The largest problem with these optical techniques is their accuracy limitations. Factors contributing to limited accuracy include: limited optical resolution of lenses, non-uniform illumination, problems with coherence, poor mechanical stability, and optical aberrations. Problems associated with the above methods' detection techniques include poor spatial resolution, slow response time, and stability or alignment problems. Although scanning electron microscopy achieves greater accuracy than the above optical methods, it too suffers from some of the same problems as well as introducing new problems in performing CD measurements.

A scanning electron microscope (SEM) operates by creating a beam of electrons which are accelerated to energies ranging from several hundred to several thousand electron volts. The electron beam is focused to a small diameter and scanned across a region of interest of a sample. As the beam strikes the sample's surface, low energy secondary electrons are emitted. The yield of secondary electrons depends on many factors such as the work function of the material, the topography of the sample, and the curvature of the surface. Because different materials may have significantly different work functions, the yield of secondary electrons may be used as a contrast mechanism to distinguish between different materials on a surface. Because changes in topography affect secondary electron yield, one may similarly measure a change in height along the sample's surface. This ability to detect rapid changes in topography is crucial for making CD measurements, for one must, for example, first determine the location of trench edges before measuring the dimensions of the trench. Electron current resulting from the surface-emitted secondary electrons is detected and used to correspondingly control the intensity of pixels on a monitor attached to the SEM. An image of the region being studied is formed by synchronously scanning the electron beam and the screen of the monitor. Even though SEMs can achieve resolution in the range of angstroms, several disadvantages hinder their ability to become an optimal tool for measuring CDs.

SEM weaknesses include the necessity of coating the sample with a conductive layer. A coating must be applied in order to avoid the affects of surface charging which occurs when a high accelerating voltage is used in the SEM. In regards to measuring CDs, the presence of a coating may change the profile of the sample being studied, negatively impacting the measurement obtained. Having to place the sample in a vacuum environment is another drawback to SEM techniques. Vacuum equipment is expensive and may require frequent maintenance; in addition, the vacuum chamber usually limits the size and orientation of the sample which may fit into the SEM. To perform vertical profile CD measurements with an SEM, one must first cleave a sample along the region of interest in order to perform SEM measurements. This requirement of cleaving is greatly limiting, for it means that the measurement technique is time consuming, destructive, and requires the acquired skill of a technician or the presence of an expensive automatic cleaving tool. SEM measurements are also limited in spatial resolution due to e-beam interactions which depend on the materials being measured. For at least these reasons, SEM is currently not an optimal method for CD measurements.

Stylus profilometer techniques are one of the most common methods for measuring CDs. A stylus profilometer is a probe which is drawn across the sample—as the stylus (usually employing a diamond tip) encounters a change in topography, a signal variation based on differential capacitance or inductance is sensed and yields an indication of the step height. Such profilometer techniques are well known in the art and are used in several commercial devices, such as the Sloan Dektak and Tencor Alpha-step machines. Advantages of using a stylus profilometer include ease of use, price, and speed. A major disadvantage, however, is due to the relatively large size of the probe itself. As the stylus is drawn across the surface of the sample, a sudden change in topography due to, for example, a trench cannot be tracked due to the size of the tip and the relatively high scanning speed.

The atomic force microscope (AFM) is a combination of the principles from scanning tunneling microscopy (to be discussed briefly below) and stylus profilometry. In atomic force microscopy, a sharp tip attached to a cantilever is scanned across the surface of a sample. The deflections of the cantilever/tip system are used to measure the small force created by the tip's close proximity to the sample. By using a feedback mechanism to control the separation distance between tip and sample, this small force ($<10^{-15}$ Newtons) may be kept constant while scanning across the surface. With a constant force, the tip motion in the z direction will mimic the topography of the sample. Thus, while scanning across the sample, the signal required to maintain a constant cantilever deflection can be recorded, and this signal corresponds to the topography of the scanned surface.

Many different techniques are used for the feedback mechanism in atomic force microscopy. The purpose of each of these differing methods is to accurately measure the cantilever's deflection. With the deflection measured accurately, the feedback mechanism can accurately control the sample/tip distance such that the cantilever deflection remains constant. Early atomic force microscopes used scanning tunneling microscopes to measure the deflection of the cantilever. Since then, there have been many other methods used to detect the deflection of the cantilever/tip system. Usually, optical means are used to measure the cantilever's deflection. For example, a laser may be shined onto the back side of a cantilever and onto an interferometer. The reflected light from the cantilever may interfere with an unreflected beam and produce interference fringes which may be used to determine the deflection of the cantilever. Another way to detect the motions of the cantilever is to shine laser light onto the back of a cantilever and collect the reflected light with a position sensitive detector. Such means are well known in the art—many atomic force manufacturers build equipment employing such means.

Because of their central role, it is important to discuss piezoelectric scanners in regard to atomic force microscopy. Scanners both move along the plane of the sample and allow the tip to track a sample's topography. Most scanners used today are produced from a piezoelectric material made of a lead zirconium titanate (PZT) tube that has been polarized radially. The tube is quartered parallel to its axis and electrodes are placed at each quarter. When a bias is applied between opposite quarters, the tube will extend or contract. When a bias is applied to only one quarter the tube will bend. Therefore, a single tube scanner can be used to both scan the surface and also to control the z-height of the tip, depending on how the applied biases are arranged. An inherent problem with atomic force microscopy scanners (and piezoelectric scanners in general) is their nonlinearity. Although an atomic force microscope's scanner would ideally respond linearly with the applied voltage, scanners exhibit intrinsic nonlinearity. A quantitative way to measure the extent of intrinsic nonlinearity is to measure the ratio of the maximum deviation from linearity to the liner extension. In commercial atomic force microscopes, intrinsic nonlinearity can range from two to ten percent. Because scanners do not respond linearly, the features of a sample may appear to have different spacing. Out of the plane of the sample, intrinsic nonlinearity causes slight (2–10%) discrepancies in topographic height measurements. Besides non linearity, atomic force microscopy scanners suffer from problems due to hysterisis, creep, and cross coupling. Hysteresis refers to the following phenomenon: if the voltage applied to a piezo is increased to a certain value and then brought back down to the original voltage, the piezo will not retract along the same path which it extended. In commercial instruments, hysteresis can be as high as 20%. Creep refers to the problem encountered by a scanner when reacting to a swift change in topography. Instead of responding instantly to a sudden change in voltage (brought about by a sudden change in topography), the piezo material responds in two steps. The first of these steps usually occurs in less than a millisecond while the second step can take as long as 100 seconds in some instruments. The effects of creep can be considered by thinking of scanning a symmetric step. As the piezo extends or contracts along the sidewalls of the step, creeping occurs; to maintain the tracking of the step, the feedback system applies a voltage countering the creep. This counter voltage appears as a ridge or shadow of the step. Cross-coupling refers to the fact that as a piezo is scanned across the x–y plane, there exists a z-component of the piezo extension. Thus, the scanner can thought to be moving in an arc. Although these factors may present some problems for making CD measurements, they are diminished by the excellent resolution and accuracy capabilities of an atomic force microscope.

Larger drawbacks to using atomic force microscopes to measure CDs relate to the microscopes' tips. In order to measure CDs with very high resolution, tips sharpened with a focused ion beam are often employed. These high aspect ratio tips allow for accurate measurements of surfaces having rapid changes in topography—such as samples being measured for critical dimensions. Although having their advantages, these tips are extremely fragile and must be replaced often if large scans are performed. Thus, atomic force microscopes present problems relating to reliability and maintenance. In addition, using atomic force microscopes to measure CDs is a very slow process. Although high resolution, the scans can be very slow, reducing throughput. Such reductions in throughput are always sought to be avoided.

As mentioned earlier, scanning tunneling microscopes (STMs) share many qualities with atomic force microscopy. Like AFMs, STMs track the surface of a sample with a sharp tip controlled by piezoelectric scanners. However, STMs, instead of a force gradient, use tunneling current between the tip and the sample as a feedback mechanism. The sharp, metallic tip (ideally the tip is a single atom at the end of a thin wire such as an etched tungsten wire) is brought sufficiently near a sample until a tunneling current is established between the tip and sample. As the tip is scanned across the surface, one may maintain a constant current via a feedback loop (constant current mode) while measuring the z response of the piezo, or the z position of tip may remain constant while the tunneling current is monitored (constant-height mode). Either way, the feedback loop (current or z response of the piezo) is correlated with the topography of the sample. Like AFMs, STMs suffer the same problems inherent with any piezoelectric scanners while scanning over features exhibiting large changes in vertical height. STMs also are not well-suited for CD measurements because the sample being studied must be conductive in order to establish a tunneling current between the tip and sample. Thus, one may not use an STM to scan over the insulators so common in the semiconductor industry. Also, most commercial STMs require a high-vacuum environment in order to achieve adequate resolution. Such vacuum equipment requires much maintenance and can be quite expensive.

It would thus be advantageous have a method and apparatus which would allow for quick, reliable, inexpensive, non-destructive, high-resolution CDs measurements.

SUMMARY OF THE INVENTION

The problems outlined above are in large part solved by the present invention. The present invention allows for quick, reliable, accurate, high-resolution, non-destructive CD measurements to be performed on a sample at ambient pressure with little or no sample preparation. A sample is placed upon a stage driven by a positioning unit. A stylus profilometer first scans the surface, generating a topographic profile. This topographic profile is analyzed to determine the number and location of features upon the sample which need to be measured. From an analysis of this profile, positions sufficiently close to features of interest are identified.

The stylus profilometer is then positioned at a location sufficiently close to a feature. This position is referred to as the first starting position and serves to align the apparatus and to define a reference point for subsequent CD measurements. The stylus profilometer tip is then vertically withdrawn and an atomic force microscope is positioned above the first starting position. The atomic force microscope tip may be precisely positioned above the first starting position by translating the stage an appropriate amount so as to move the first starting position under the tip or by rotating the apparatus so that the atomic force microscope tip aligns over the first starting position. The atomic force microscope engages the sample and scans the sample from the first starting position, measuring the distance from the first starting position to the edge of the feature of interest.

The stylus profilometer is then positioned back to the first starting position and measures the distance from the first starting position to the second starting position (the second starting position is a position sufficiently close to a second feature of the sample being measured). The stylus profilometer is then withdrawn, the atomic force microscope is positioned above the second starting position, engages the sample, and scans the sample from the second starting position, measuring the distance from the second starting position to the edge of the second feature. In this manner, a CD measurement is made.

BRIEF DESCRIPTION OF THE DRAWINGS

Other objects and advantages of the invention will become apparent upon reading the following detailed description and upon reference to the accompanying drawings in which.

Figure 1:
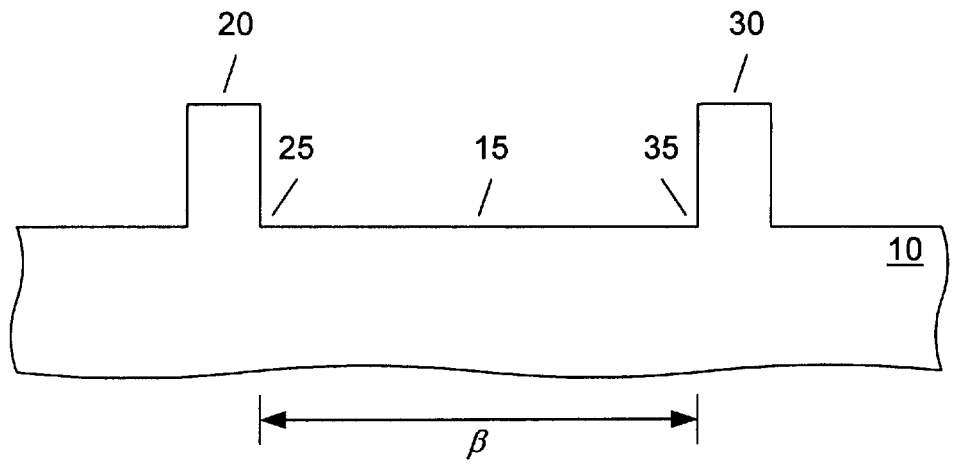
FIG. 1 is cross section view of a sample having a critical dimension topography to be measured by the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

It will be appreciated to those skilled in the art having the benefit of this disclosure that this invention is believed to be capable of performing reliable, quick, high-resolution, accurate measurements of critical dimensions. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

Shown in FIG. 1 is a cross section of a sample to be measured by the present invention. Sample 10 includes features 20 and 30 having edges 25 and 35 respectively. Features 20 and 30 define a trench with surface 15. Edges 25 and 35 define lateral bounds of a critical dimension represented by $\beta$.

Figure 2:
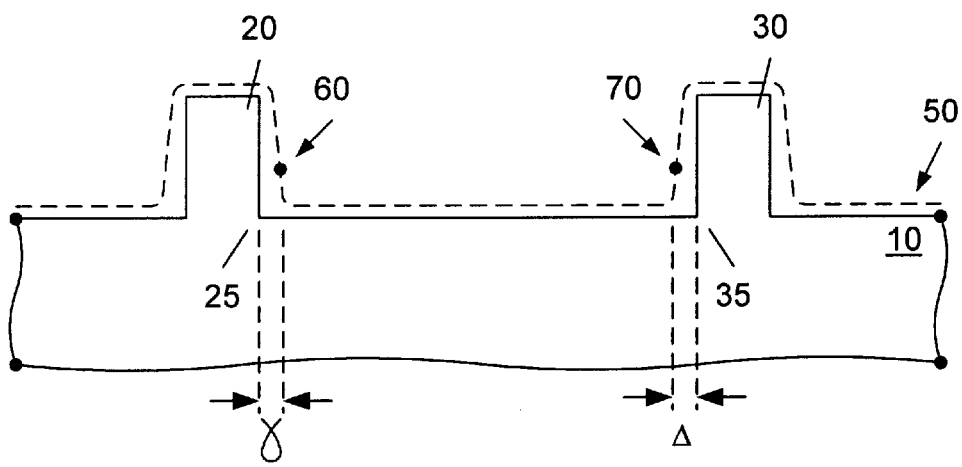
FIG. 2 is a cross section view of the sample depicting the path of a scanning stylus profilometer used in the measurement of the sample critical dimension.

Shown in FIG. 2 is sample 10 and an outline 50 of the path taken by a stylus profilometer upon scanning the sample. As can be seen, the path of the stylus does not track the exact topography of the surface. When the stylus profilometer encounters a sudden change in topography such as that presented by vertical features 20 and 30, it is very difficult to accurately trace the surface. This is due to several well-known factors including, for example, tip geometry, scanning speed, applied force of contact, behavior of the controlling electronics, and the material of the sample.

The purpose of the preliminary stylus profilometer scan is to quickly map the topography of the surface so as to determine the location of features 20 and 30 and consequently to determine the approximate locations of edges 25 and 35. Once the preliminary scan has been completed, outline 50, representing the topographic profile of sample 10, may be analyzed to determine a position sufficiently close to a feature, such as feature 20. Many common algorithms exist which may be used to automatically approximate a position close to an edge of a feature according to a topographic profile. For example, one may look for an inflection point in the profile such as inflection point 60 or 70. The inflection point represents an initial change in the elevation of surface 15 as measured by detection equipment operably linked to the stylus profilometer. One may assume that directly below such an inflection point is a position sufficiently close to the edge of a feature. Distances y and A represent such positions sufficiently close to edges 25 and 35 respectively. Such positions will be referred to as a first and second starting position respectively.

Once a position sufficiently close to an edge is discovered, the stylus profilometer is then returned to this position. Subsequently, the atomic force microscope scans the sample from this position, measuring the distance to the edge of the feature ($\gamma$ and $\Delta$ in this case).

Figure 3:
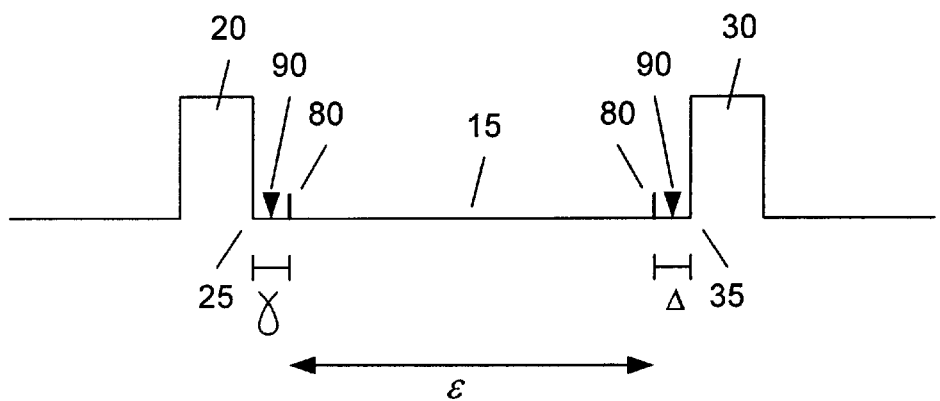
FIG. 3 is a cross section view of the sample demonstrating how the critical dimension of the sample is to be measured by using a combined atomic force microscope and stylus profilometer.

FIG. 3 will be used to describe how the method of the current invention operates. As discussed above, a preliminary stylus profilometer scan is used to determine a position sufficiently close to edge 25 of feature 20 of sample 10. Once this has been done, the tip 80 of the stylus profilometer is brought to the first starting position—the position sufficiently close to edge 25 (here, sufficiently close is represented by a distance y from edge 25). Tip 80 of the stylus profilometer is positioned to this location so that the apparatus may be aligned at a known reference point; here, the known reference point is the point along sample 10 represented by an inflection point 60 (or 70) of topographic profile outline 50 (shown in FIG. 2). After aligning the apparatus at the first starting position, tip 90 of the atomic force microscope is positioned above the first starting position (tip 80 can be withdrawn prior to this to avoid potential damage), engages the surface, and scans surface 15, measuring the distance from the first starting position to edge 25. Thus, tip 90 measures the distance y. Because the scanning range of atomic force microscopes is limited, it is important that the first starting position be within scanning range of edge 25—hence, the first starting position must be sufficiently close to feature 20. To measure the distance y, one may analyze a topographic profile generated by the scanning of the atomic force microscope. It is well-known that one may quite accurately determine the location at which the atomic force microscope encounters a sudden change in topography. It is such a sudden change which signals the location of edge 25.

After the atomic force microscope has measured distance $\gamma$, tip 80 is again positioned at the first starting position (tip 90 is extracted vertically from the surface prior to this operation to avoid tip damage). Tip 80 is then positioned sufficiently close to feature 30. Tip 80 of the stylus profilometer is moved to this second starting position so that the measuring apparatus may be aligned at a known starting point; here, the known reference point is a point along the sample represented by an inflection point of topographic profile outline 50 (shown in FIG. 2). The distance between the first and second starting positions is measured by the electronics unit of the stylus profilometer or by other means well known in the commercial art. Therefore, the distance $\epsilon$ is measured.

Tip 90 is then positioned above the second starting position, engages the surface, and scans surface 15, measuring the distance from the second starting position to edge 35.

Again, it is important that the second starting position be sufficiently close to feature 30 (i.e. within scanning range of the atomic force microscope). Therefore, tip 90 measures distance $\Delta$.

Thus, after a preliminary stylus profilometer scan and two short atomic force microscopy scans, the critical dimension represented here by $\gamma+\epsilon+\Delta$ is measured with high resolution. The present method presents many important advantages by utilizing the strengths of both stylus profilometers and atomic force microscopes. A quick, even low-resolution, preliminary scan by the stylus profilometer locates the features of the sample defining a critical dimension. Such quick scans are especially well-suited for stylus profilometers. From the topographic profile from the preliminary scan, a position sufficiently close to the edge of a feature may be approximately defined and automatically located using an appropriate edge-finding algorithm or similar means. After an alignment, the atomic force microscope is employed to measure, with very high-resolution, the distance from the starting point to the edge of the feature. Atomic force microscopes are especially well-suited for such short, high-resolution scans. Because the atomic force microscope is only used in a limited capacity to make short scans, the tip life is prolonged dramatically, reducing maintenance time and therefore increasing throughput. Because the atomic force microscope can achieve such high resolution results, the current method eliminates many of the problems associated with poor tracking by a stylus profilometer acting alone due to, for example, large tip geometries. After completing the first atomic force microscope scan, the stylus profilometer is used to measure the relatively large distance to the second starting position. Stylus profilometers are especially well-suited for this task because they are able to accurately measure such distances quickly without significant adverse affects due to tip geometries. After positioning at the second starting position, the atomic force microscope again is employed for a short, high-resolution scan, again utilizing the inherent favorable characteristics of the atomic force microscope, such as its high resolution and accuracy.

The current methodology is also useful for additionally measuring a vertical profile of a feature. The steps comprising the method are very similar—the main difference being that the atomic force microscope scans from the starting positions along the vertical sidewalls of the features. Such a scan may give the user valuable information regarding the slope and condition of the sidewall.

Figure 4:
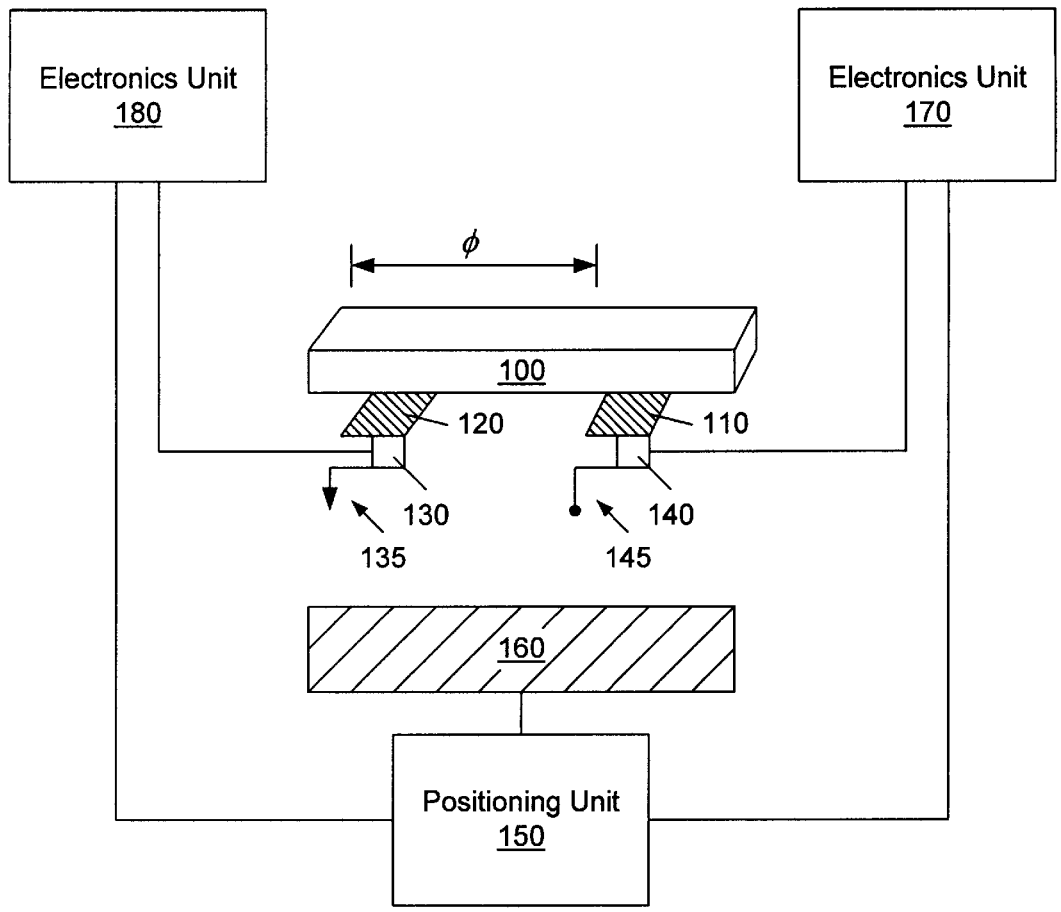
FIG. 4 depicts the apparatus of the present invention having a combined atomic force microscope and stylus profilometer separated along a supporting structure, their electronics units, a stage, and a positioning unit.

FIG. 4 depicts an embodiment of the apparatus of the present invention. Shown is supporting structure 100 which supports stylus profilometer 140 and atomic force microscope 130 with supports 110 and 120, respectively. Electronics unit 170 is coupled to stylus profilometer 140, and electronics unit 180 is coupled to atomic force microscope 130. These electronics units employ standard elements well-known in the commercial art for controlling profilometers and atomic force microscopes and for acquiring and analyzing the data associated therewith.

Shown also in FIG. 4 is stage 160 configured to hold the sample to be measured. Positioning unit 150 is coupled to stage 160 and to electronic units 170 and 180. Positioning unit 150 acts to precisely control the motion of stage 160 by well-known means, such as stepper motors.

Atomic force microscope tip 135 is situated a fixed distance $\phi$ from stylus profilometer tip 145. Distance $\phi$ is known precisely. During operation, it is important that tip 135 be moved to a specific starting position defined by the location of tip 145 (as discussed in more detail above, tip 145 is moved to a first or second starting position determined to be sufficiently close to a feature—tip 135 is then scanned from these starting positions). To accomplish this task, positioning unit 150 may be programmed to automatically translate stage 160 a distance φ after tip 145 has been positioned at a starting position (tip 145 may be retracted via electronics unit 170 before such stage translation to avoid possible damage to the tip). By translating stage 160 precisely by a distance φ, tip 135 is properly aligned and may be lowered onto sample 10 to begin scanning from the proper starting position. Thus, the present apparatus allows for an accurate measurement of the distance from a specific starting position to an edge of a feature.

Figure 5:
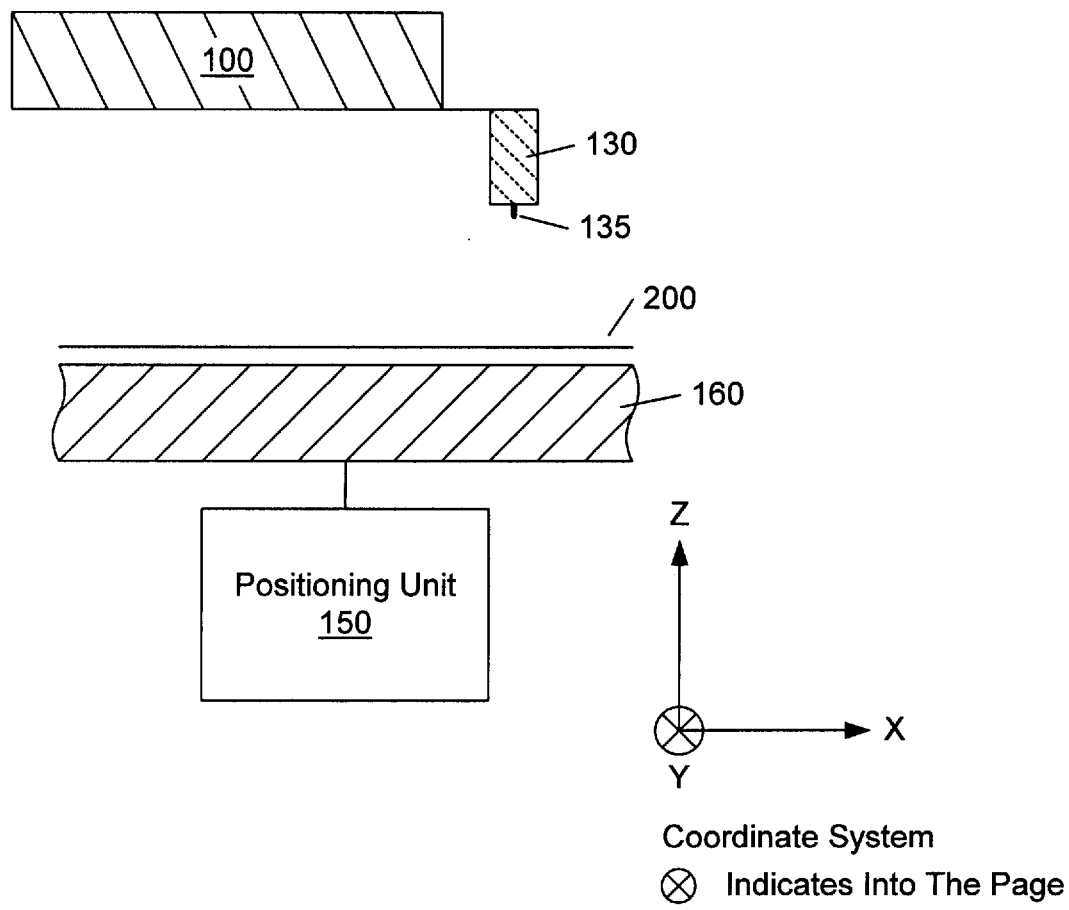
FIG. 5 is a side view of the apparatus of the present invention.

FIG. 5 is a side view of the apparatus including sample 200 mounted on stage 160 by means well known in the art, such as by a suction force. Shown also is coordinate system 190. The apparatus is configured so that stage 160 is driven in the x–y plane while tips 135 and 145 (not shown in FIG. 5) may be extended or retracted in the z direction. To achieve the stage translation mentioned above, positioning unit 150 translates stage 160 by a distance φ in the y direction.

Figure 6:
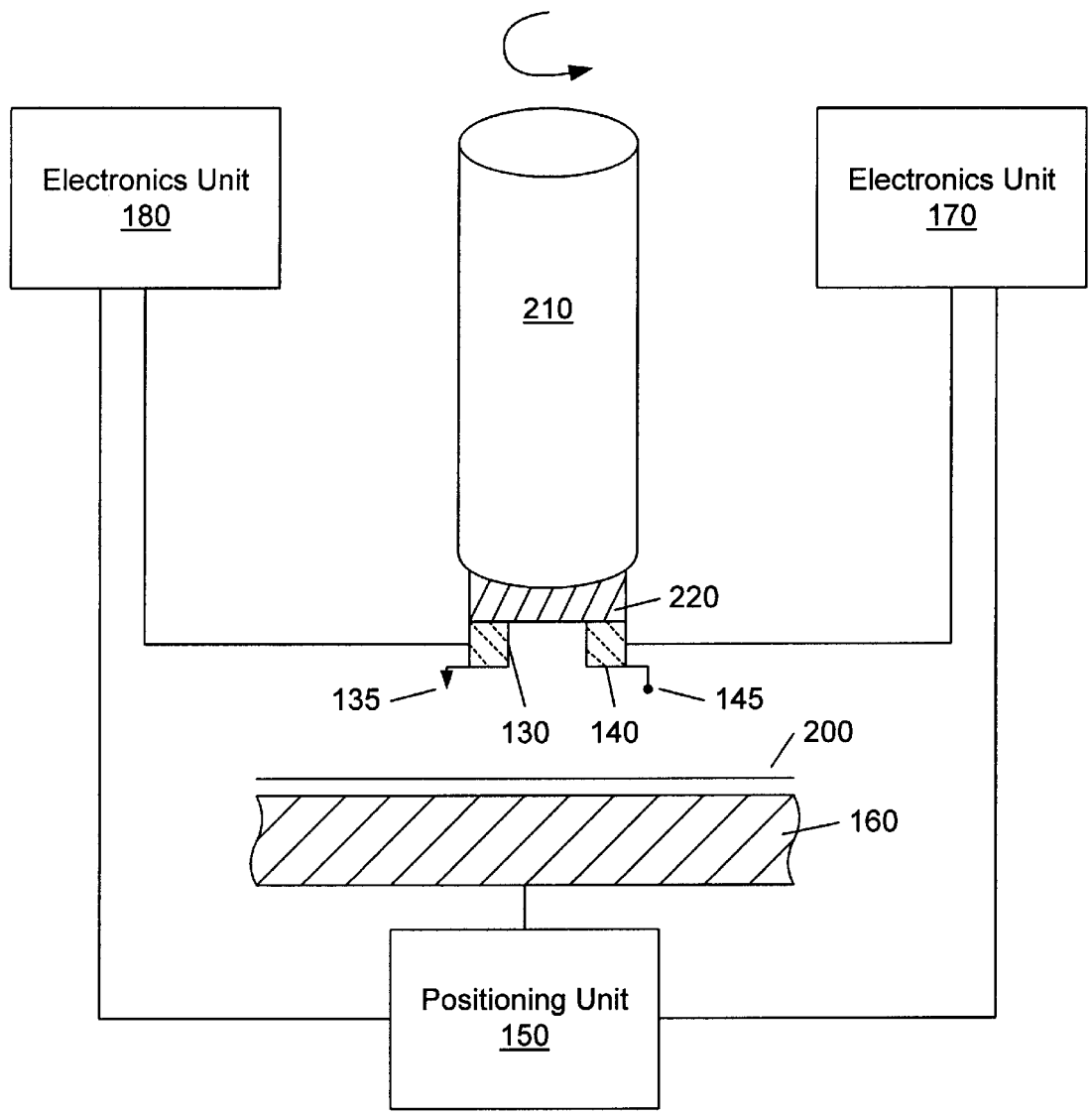
FIG. 6 is another embodiment of the present invention having a combined atomic force microscope and stylus profilometer mounted on a supporting structure which rotates. Shown also are the electronic units, sample, stage, and positioning unit.

FIG. 6 is an alternative embodiment of the apparatus for measuring critical dimensions. Shown is support structure 210 coupled to an additional support 220 from which atomic force microscope 130 and stylus profilometer 140 are mounted. Atomic force microscope 130 and stylus profilometer 140 are mounted back-to-back across opposite ends of the support structure. That is, if one imagines atomic force microscope tip 135 representing the head of an arrow and, similarly, the tip 145 representing the head of an arrow, then the two arrows are anti-parallel and co-linear along a line passing through the center of support 220.

Again, it is important during operation that tip 135 be moved to a specific starting position defined by the location of tip 145. To accomplish this task, this embodiment rotates support 210 by one-hundred and eighty degrees (again, tip 145 may be retracted during the rotation to avoid potential damage). A one-hundred-eighty degree rotation brings tip 135 to the proper starting position so that a high-resolution atomic force microscopy scan may be executed to determine the distance from the starting position to a feature edge. Structure 210 is precisely rotated by well-known means.

What is claimed is:

1. A method for measuring critical dimensions comprising:
    positioning a first probe at a first starting position between a first and second feature on a surface, said first starting position located a lateral distance from said first feature;
    measuring the distance from said first starting position to said first feature by scanning said surface between said first starting position and said first feature with a second probe;
    positioning said first probe at a second starting position between said first and second features, said second starting position located a lateral distance from said second feature;
    measuring the distance from said first starting position to said second starting position; and
    measuring the distance from said second starting position to said second feature by scanning said surface between said second starting position and said second feature with said second probe.

2. The method as recited in claim 1, wherein said first probe consists of a stylus profilometer.

3. The method as recited in claim 1, wherein said second probe consists of an atomic force microscope.

4. The method as recited in claim 1, wherein said first and second starting positions are determined by analysis of a topographic profile produced by scanning said first probe across said surface prior to positioning said first probe at said first position.

5. The method as recited in claim 1, wherein said first and second starting positions are located a particular distance from said first and second features, wherein said particular distance is less than or equal to the scanning range of said second probe.

6. The method as recited in claim 1, wherein said second probe further scans said first and second features to determine the vertical profile of said features.

7. A method for measuring critical dimensions on a surface of a sample positioned upon a stage comprising the steps of:
    scanning said surface with a stylus profilometer to determine the topographic profile of said sample;
    analyzing said topographic profile to determine the locations of a first and second feature;
    positioning said stylus profilometer in accord with said topographic profile at a first starting position located within scanning range of an atomic force microscope from the edge of said first feature;
    positioning the tip of said atomic force microscope at said first starting position;
    scanning with said atomic force microscope said surface from said first starting position to said edge of said first feature to measure the distance from said first starting position to said edge of said first feature;
    positioning said stylus profilometer in accord with said topographic profile at a second starting position located within scanning range of said atomic force microscope from the edge of said second feature;
    measuring the distance from said first to said second starting positions;
    positioning the tip of said atomic force microscope at said second starting position; and
    scanning with said atomic force microscope said surface from said second starting position to said edge of said second feature to measure the distance from said second starting position to said edge of said second feature.

8. The method as recited in claim 7, wherein the tip of said atomic force microscope is positioned over said starting positions by translating said stage a fixed distance so that said tip is aligned over said starting positions.

9. The method as recited in claim 7, wherein the tip of said atomic force microscope is positioned over said starting positions by rotating said stylus profilometer and said atomic force microscope by 180 degrees so that said tip is aligned over said starting positions.

10. An apparatus for measuring critical dimensions on a sample comprising:
    a stylus profilometer and atomic force microscope coupled to a supporting structure, wherein said apparatus is configured to locate said atomic force microscope at a position on said sample formerly occupied by said stylus profilometer;
    a first electronics unit coupled to said stylus profilometer configured to control scanning of said profilometer and for data acquisition associated therewith;

a second electronics unit coupled to said atomic force microscope configured to control scanning of said atomic force microscope and for data acquisition associated therewith;

a stage configured to hold a sample to be measured; and a positioning unit coupled to said stage and electronics units and configured to translate said stage.

11. The apparatus as recited in claim 10, wherein said support structure is configured to hold said stylus profilometer and said atomic force microscope so that the tip of said stylus profilometer is located a fixed distance from the tip of said atomic force microscope.

12. The apparatus as recited in claim 11, wherein said positioning unit is configured to automatically move said stage said fixed distance so that the tip of said atomic force microscope may automatically be placed in position to perform a scan of said sample from a position formerly occupied by said tip of said stylus profilometer.

13. The apparatus as recited in claim 10, wherein said stylus profilometer and said atomic force microscope are positioned antiparallel on said support structure.

14. The apparatus as recited in claim 13, wherein said support structure is configured to rotate 180 degrees so that the tip of said atomic force microscope may automatically be placed in a position to perform a scan of said sample from a position formerly occupied by said tip of said stylus profilometer.

15. The apparatus as recited in claim 10, wherein said positioning unit controls motion of said stage in the x–y plane, wherein said first electronics unit controls motion of said atomic force microscope in the z plane, and wherein said second electronics unit controls motion of said stylus profilometer in the z-plane.

* * * * *